(12) United States Patent
Kim (10) Patent No.: US 11,996,569 B2
(45) Date of Patent: May 28, 2024

(54) HIGH VOLTAGE BATTERY PROTECTION PACK

(71) Applicant: HYUNDAI MOBIS Co., Ltd., Seoul (KR)

(72) Inventor: Sang Woo Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 267 days.

(21) Appl. No.: 17/464,164

(22) Filed: Sep. 1, 2021

(65) Prior Publication Data

US 2022/0069391 A1 Mar. 3, 2022

(30) Foreign Application Priority Data

Sep. 2, 2020 (KR) .................. 10-2020-0111950
Sep. 2, 2020 (KR) .................. 10-2020-0111953

(51) Int. Cl.
*H01M 50/169* (2021.01)
*H01M 50/171* (2021.01)
*H01M 50/186* (2021.01)

(52) U.S. Cl.
CPC ....... *H01M 50/169* (2021.01); *H01M 50/171* (2021.01); *H01M 50/186* (2021.01)

(58) Field of Classification Search
CPC . H01M 50/169; H01M 50/186; H01M 50/171
See application file for complete search history.

(56) References Cited

U.S. PATENT DOCUMENTS

| 2013/0084481 A1* | 4/2013 | Yoon | H01M 50/103 |
| | | | 429/99 |
| 2018/0175351 A1* | 6/2018 | Kim | F16B 43/001 |
| 2019/0081297 A1* | 3/2019 | Nakamori | H01M 50/124 |
| 2021/0175480 A1* | 6/2021 | White | H01M 50/249 |
| 2021/0175568 A1* | 6/2021 | Geshi | H01M 50/342 |

FOREIGN PATENT DOCUMENTS

| CN | 112290139 A | * | 1/2021 | ............... B60K 1/04 |
| JP | 2017183619 A | * | 10/2017 | |
| WO | WO-2021225203 A1 | * | 11/2021 | |

OTHER PUBLICATIONS

Machine Translation in English of WO-2021225203. (Year: 2023).*
Machine Translation in English of CN-112290139. (Year: 2023).*
Machine Translation of JP-2017183619. (Year: 2023).*

* cited by examiner

*Primary Examiner* — Jane J Rhee
(74) *Attorney, Agent, or Firm* — Morgan, Lewis & Bockius LLP (57) ABSTRACT

A high voltage battery protection pack according to one embodiment of the present invention includes an upper case including a coupling plate protruding along an outer circumferential surface of the upper case and a plurality of coupling holes formed in the coupling plate to be spaced apart from each other, a lower case in which a connecting plate having a shape corresponding to the coupling plate and including a weld groove formed by partial engraving is formed to protrude from an outer circumferential surface of the lower case, a weld nut which is disposed between the upper case and the lower case to maintain an axial force and is welded to the weld groove of the connecting plate, an assembly bolt which passes through the coupling hole of the upper case and is insertion-coupled to the weld nut, and a gasket which seals a space between the upper case and the lower case.

18 Claims, 8 Drawing Sheets

HIGH VOLTAGE BATTERY PROTECTION PACK

CROSS-REFERENCE TO RELATED APPLICATION

This application claims priority to and the benefit of Korean Patent Application No. 10-2020-0111953, filed on Sep. 2, 2020, and No. 10-2020-0111950, filed on Sep. 2, 2020, the disclosure of which are incorporated herein by reference in its entirety.

BACKGROUND

1. Field of the Invention

The present invention relates to a high voltage battery protection pack.

2. Discussion of Related Art

In a general watertight structure of a battery, a weld bolt and a nut are welded in a state in which a hole is formed to pass through a lower case. Since such a weld region may not ensure perfect airtightness, moisture may penetrate into a gasket.

There is a bush that generates a torque and an axial force in the gasket. In a case in which moisture is introduced into the bush, friction force is lowered, and thus a screw loosening phenomenon may occur.

In this case, since the gasket and the bush are not integrated, the bush should be forcibly inserted to be coupled to the gasket through an additional manual operation. That is, this causes an increase in working time.

In addition, since there are many cases in which the bush is separated from the gasket into which the bush is forcibly inserted when goods are transported, there is a problem of causing a quality problem.

SUMMARY OF THE INVENTION

The present invention is directed to providing a high voltage battery protection pack in which a weld hole of a lower case and a bush, which are moisture penetration paths, are removed to improve airtightness performance and reduce a cost.

Objectives to be solved by the present invention are not limited to the objectives described above, and other objectives not described above will be clearly understood from the following descriptions by those skilled in the art.

According to one aspect of the present invention, there is provided a high voltage battery protection pack including an upper case having a coupling plate protruding along an outer circumferential surface of the upper case and a plurality of coupling holes formed in the coupling plate to be spaced apart from each other, a lower case in which a plurality of weld bolts passing through the coupling holes of the upper case are welded to an upper portion of a connecting plate protruding from an outer circumferential surface of the lower case, and a gasket which seals a space between the upper case and the lower case and includes protection holes surrounding head parts of the weld bolts.

The connecting plate may be formed in a shape corresponding to the coupling plate, and the head parts of the weld bolts may be welded to an upper surface of the connecting plate to be spaced apart from each other.

A weld groove, which is recessed in a shape corresponding to the head part, may be formed in the upper surface, to which the head part of the weld bolt is welded, of the connecting plate.

The weld groove recessed in a shape that is relatively wider than the head part may be formed in the upper surface, to which the head part of the weld bolt is welded, of the connecting plate, and a weld bead may be formed between the weld groove and the head part.

A bracket in which connecting holes correspond to the coupling holes of the upper case may be coupled to the upper portion of the coupling plate.

The bracket may be formed in a shape corresponding to the coupling plate and may include reinforcing plates in some sections of the bracket.

A shaft part of the weld bolt may be insertion-coupled to an end of the assembly nut in a state in which the shaft part sequentially passes through the coupling hole of the upper case and the connecting hole of the bracket, and as a gap between the head part of the weld bolt and the assembly nut decreases, the gasket may be compressed, and the upper and the lower cases may be pressed against each other.

The gasket may include steps protruding upward and downward, and upper and lower fixing grooves may be formed in regions of the upper and lower cases in contact with the steps of the gasket.

The protection hole of the gasket may have a diameter which is relatively greater than a diameter of the head part of the weld bolt.

According to another aspect of the present invention, there is provided a high voltage battery protection pack including an upper case having a coupling plate formed to protrude along an outer circumferential surface of the upper case, a lower case which is in airtight contact with the upper case, and a bracket formed in a shape corresponding to the coupling plate and disposed on the coupling plate.

In this case, the lower case may include a connecting plate formed to protrude from an outer circumferential surface of the lower case and disposed under the coupling plate and a weld bolt which is welded to an upper portion of the connecting plate, passes through the coupling plate and the bracket, and is fixed by an assembly nut.

An end portion of the connecting plate may be formed to be bent upward and coupled to the coupling plate in a snap-fit manner.

The upper and lower cases may be airtightly coupled and spaced apart from each other to correspond to the head part of the weld bolt.

The bracket may include a connecting hole through which a shaft part of the weld bolt passes.

The coupling plate may include a coupling hole through which the shaft part of the weld bolt passes.

According to still another aspect of the present invention, there is provided a high voltage battery protection pack including an upper case having a coupling plate protruding along an outer circumferential surface of the upper case and a plurality of coupling holes formed in the coupling plate to be spaced apart from each other, a lower case in which a connecting plate formed in a shape corresponding to the coupling plate is formed to protruded from an outer circumferential surface of the lower case, and a weld nut communicating with the coupling hole of the upper case is welded to an upper portion of the connecting plate, a gasket which seals a space between the upper case and the lower case and includes a protection hole surrounding the weld nut, and an assembly bolt which passes through the coupling hole of the upper case and is insertion-coupled to the weld nut.

The assembly bolt may include a head part in contact with the coupling plate of the upper case and a shaft part formed to extend from the head part and including a screw thread on an outer circumferential surface of the shaft part.

A length of the shaft part is formed to be relatively smaller than a stack thickness of the coupling plate, the connecting plate, and the gasket.

In this case, the high voltage battery protection pack according to still another aspect of the present invention may further include a bracket having a connecting hole communicating with the coupling hole and disposed on the coupling plate.

In this case, the assembly bolt may pass through the coupling hole and may be insertion-coupled to the weld nut in a state in which the assembly bolt passes through the connecting hole.

The assembly bolt may include a head part in contact with the bracket of the upper case and a shaft part formed to extend from the head part and including a screw thread on an outer circumferential surface of the shaft part.

A length of the shaft part may be relatively smaller than or equal to a stack thickness of the bracket, the coupling plate, the connecting plate, and the gasket.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the following embodiments and the accompanying drawings. However, the present invention is not limited to the embodiments to be disclosed below and may be implemented in various different forms, the embodiments are provided in order to fully describe the present invention and fully describe the scope of the present invention for those skilled in the art, and the scope of the present invention is only defined by the appended claims. Meanwhile, the terms used herein are provided only to describe the specific embodiments of the present invention and are not for purposes of limitation. Unless the context clearly indicates otherwise, the singular forms described in the specification include the plural forms. In addition, the terms "comprise" and/or "comprising" used herein do not preclude the presence or addition of one or more other components in addition to described components.

Hereinafter, exemplary embodiments of the present invention will be described in detail with reference to the accompanying drawings. In this case, the embodiments will be separately described, and in order to simply describe the content, repeated content described in a previous embodiment will be omitted in the following embodiment. Content which needs to be emphasized may be repeatedly described as necessary.

The content described in each of the embodiments (first to fourth embodiments) below is descriptions of each embodiment supporting the content of the claims.

First embodiment

Figure 1:
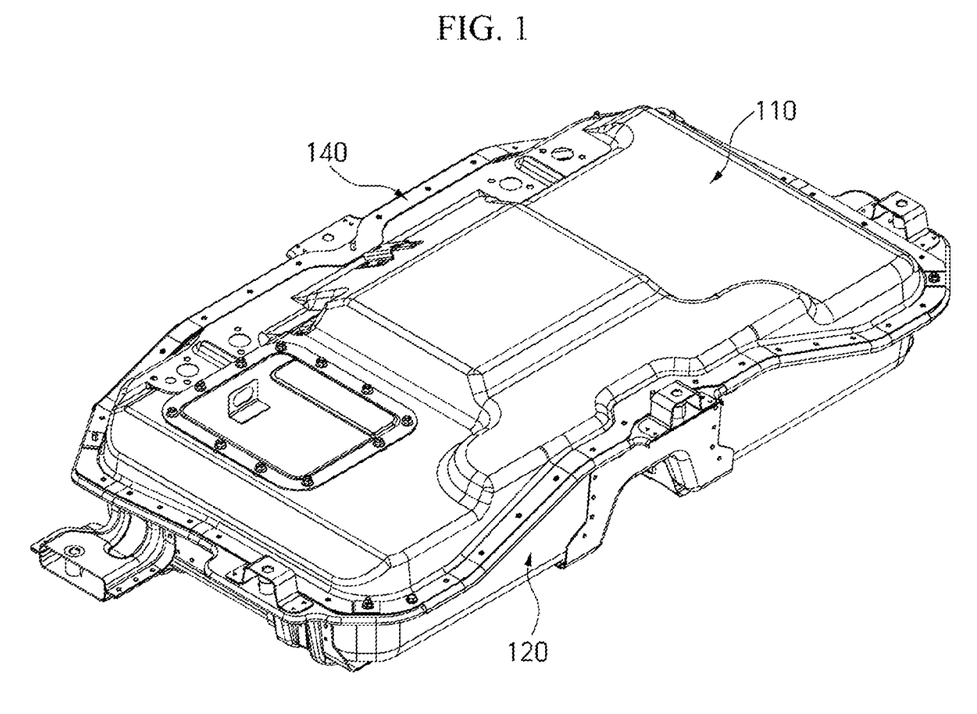
FIG. 1 is a perspective view illustrating a high voltage battery protection pack according to a first embodiment of the present invention.
Figure 2:
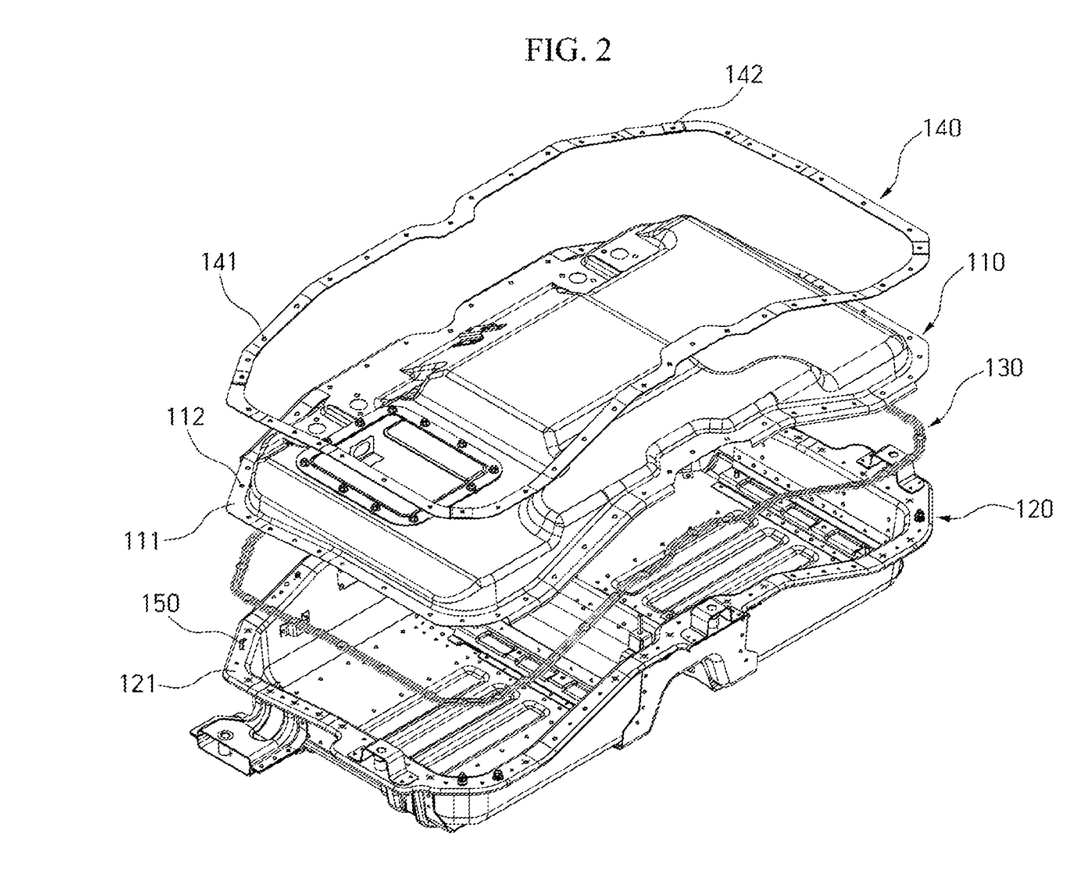
FIG. 2 is an exploded perspective view illustrating the high voltage battery protection pack according to the first embodiment of the present invention.
Figure 3:
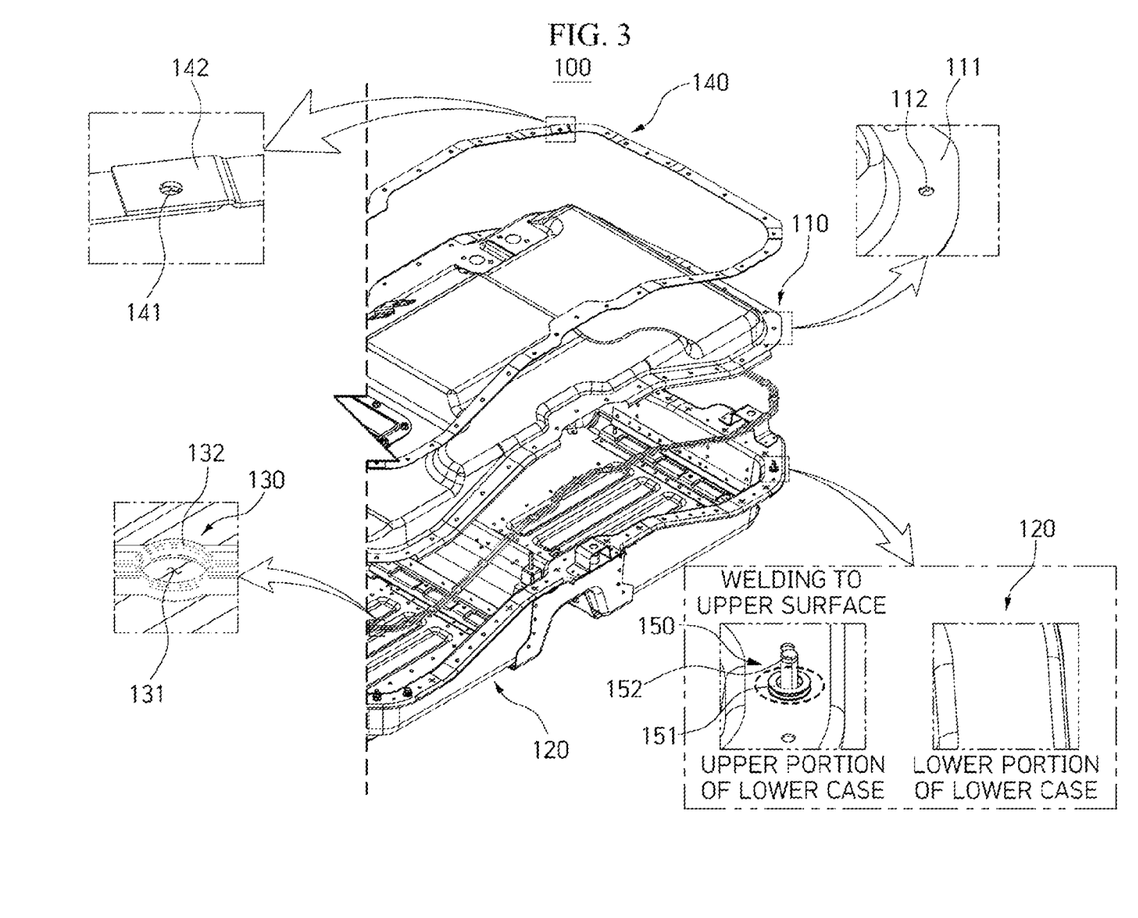
FIG. 3 is a partial perspective view illustrating components of the high voltage battery protection pack according to the first embodiment of the present invention.

FIG. 1 is a perspective view illustrating a high voltage battery protection pack according to one embodiment of the present invention, FIG. 2 is an exploded perspective view illustrating the high voltage battery protection pack according to one embodiment of the present invention, and FIG. 3 is a partial perspective view illustrating components of the high voltage battery protection pack according to one embodiment of the present invention.

Referring to FIGS. 1 to 3, a high voltage battery protection pack 100 includes an upper case 110, a lower case 120, a gasket 130, and a bracket 140.

The upper case 110 includes a coupling plate 111 and a coupling hole 112.

In this case, the coupling plate 111 is formed in a shape protruding along an outer circumferential surface of the upper case 110. The coupling hole 112 is provided as a plurality of coupling holes 112 which are formed in the coupling plate 111 to be spaced apart from each other.

The lower case 120 has a structure disposed under and assembled with the upper case 110. A connecting plate 121 is formed to protrude from an outer circumferential surface of an upper end of the lower case 120. A plurality of weld bolts 150, which pass through the coupling holes 112 of the upper case 110, are welded to an upper portion of the connecting plate 121.

The gasket 130 seals a space between the upper case 110 and the lower case 120. To this end, the gasket 130 is formed of a rubber material which is elastically deformable. In this case, the gasket 130 includes protection holes 131 surrounding head parts 151 of the weld bolts 150.

The protection hole 131 of the gasket 130 may have a diameter relatively greater than a diameter of the head part 151 of the weld bolt 150. This is so that the gasket 130 can be smoothly fixed between the upper and lower cases 110 and 120. Accordingly, a working time can also be effectively reduced.

In a conventional gasket, bushes (not shown) are forcibly inserted into a plurality of holes formed in a longitudinal direction to generate a torque and an axial force. However, when moisture is introduced into the hole, a friction force is lowered, and thus a screw loosening phenomenon occurs.

In addition, since the conventional gasket is not integrated with the bush, this is cumbersome because the bush should be forcibly inserted into the gasket through an additional manual operation.

In order to solve the conventional problem, a bush is removed from the gasket 130 of the present invention. In the case of the present invention, since an axial force of the gasket 130 is generated by the head part 151 of the weld bolt 150, there is no durability problem.

Meanwhile, the gasket 130 includes steps 132 which protrude upward and downward. In this case, upper and lower fixing grooves (not shown) may be formed in regions of the upper case 110 and the lower case 120 in contact with the steps 132 of the gasket 130. Such a structure provides an effect that the gasket 130 can be more firmly fixed between the upper and lower cases 110 and 120, and the airtightness performance can be improved at the same time.

The bracket 140 is disposed on the coupling plate 111 of the upper case 110. The bracket 140 includes connecting holes 141 corresponding to the coupling holes 112 of the upper case 110. In this case, the bracket 140 is formed in a shape corresponding to the coupling plate 111. In addition, the bracket 140 includes reinforcing plates 142 in some sections to have good durability.

Figure 4:
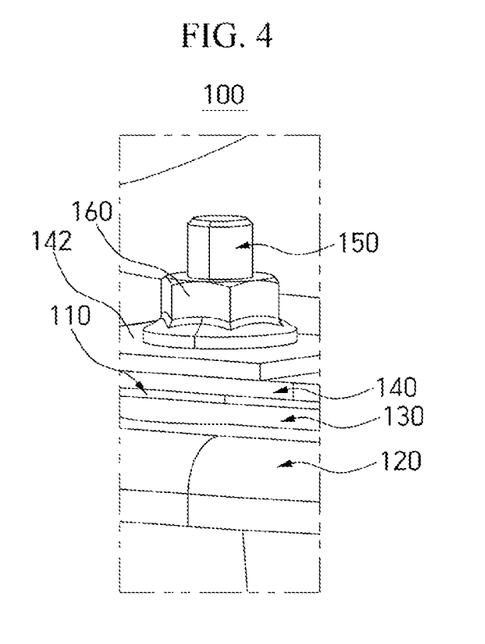
FIG. 4 is an assembly view illustrating an upper portion of the high voltage battery protection pack according to the first embodiment of the present invention.
Figure 5:
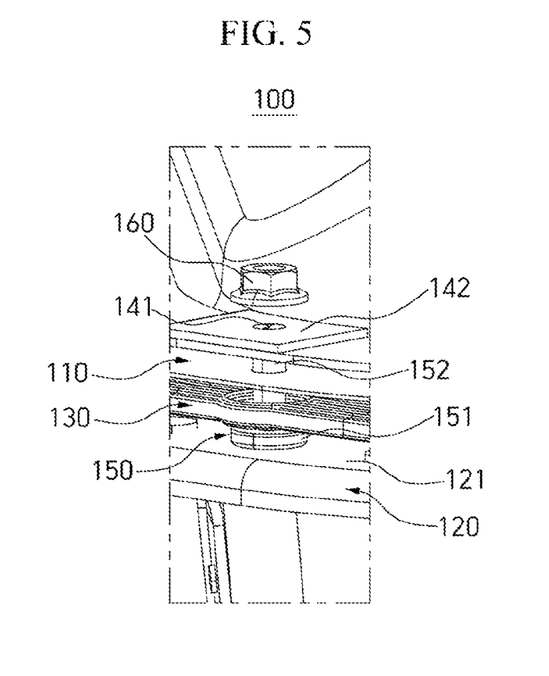
FIG. 5 is an exploded assembly view illustrating the upper portion of the high voltage battery protection pack according to the first embodiment of the present invention.
Figure 6:
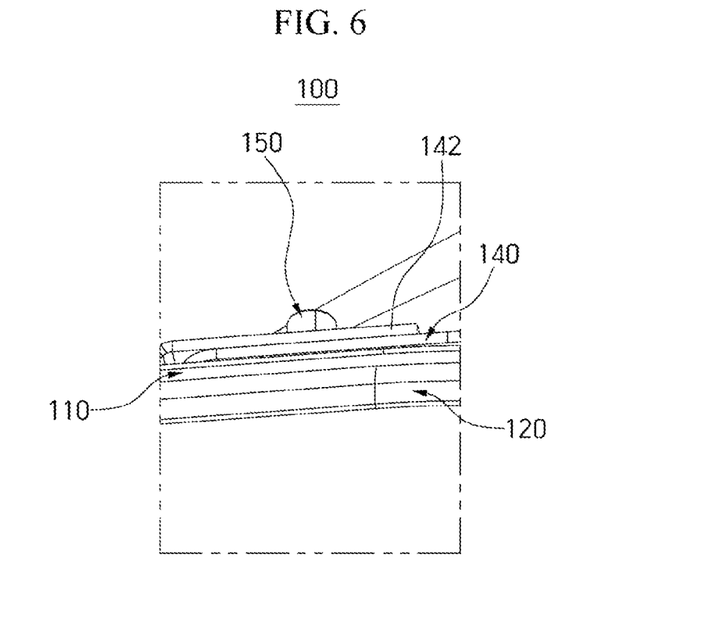
FIG. 6 is an assembly view illustrating a lower portion of the high voltage battery protection pack according to the first embodiment of the present invention.

FIG. 4 is an assembly view illustrating an upper portion of the high voltage battery protection pack according to one embodiment of the present invention, FIG. 5 is an exploded assembly view illustrating the upper portion of the high voltage battery protection pack according to one embodiment of the present invention, and FIG. 6 is an assembly view illustrating a lower portion of the high voltage battery protection pack according to one embodiment of the present invention.

Referring to FIGS. 4 to 6, the connecting plate 121 is formed in a shape corresponding to the coupling plate 111. The head parts 151 of the weld bolts 150 are welded to an upper surface of the connecting plate 121 to be spaced apart from each other.

There are no additional holes in a lower portion of the connecting plate 121. Conventionally, weld bolts 150 are inserted into and welded to additional holes, and a problem that moisture penetrates this weld region occurs sometimes.

Accordingly, in the lower case 120 of the present invention, the weld bolt 150 is not inserted and not welded as in the conventional case, and the head part 151 is welded to the upper portion of the connecting plate 121 so that the weld bolt 150 is completely prevented from being in contact with the outside. Accordingly, since an airtight structure is formed between the upper case 110 and the lower case 120, a structure with improved watertight performance is obtained when compared to the conventional case.

Figure 7:
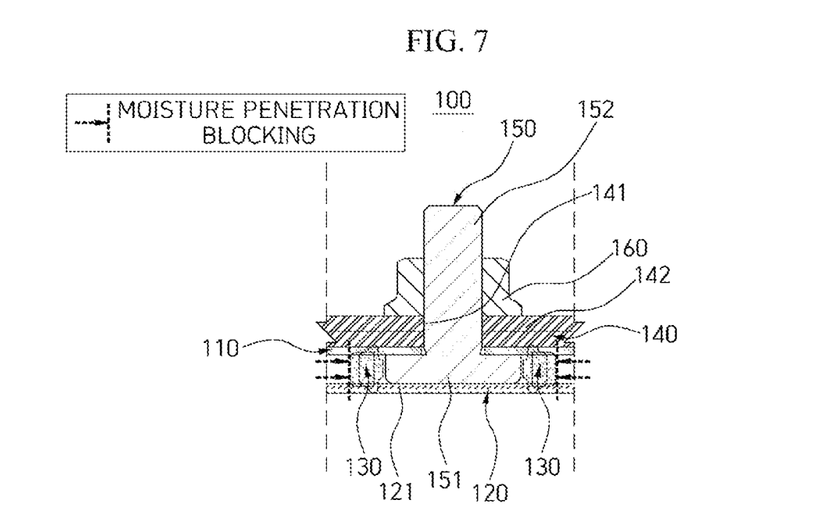
FIG. 7 is a partial cross-sectional view illustrating the high voltage battery protection pack according to the first embodiment of the present invention.

FIG. 7 is a partial cross-sectional view illustrating the high voltage battery protection pack according to one embodiment of the present invention.

Referring to FIG. 7, the gasket 130 is disposed between the upper case 110 and the lower case 120. The weld bolt 150 is welded to the upper portion of the connecting plate 121 of the lower case 120.

That is, the head part 151 of the weld bolt 150 is welded to the connecting plate 121, and a shaft part 152 of the weld bolt 150 passes through the coupling hole 112 (see FIG. 3) of the upper case 110 and the connecting hole 141 (see FIG. 3) of the bracket 140.

In this case, an assembly nut 160 and an end of the shaft part 152 of the weld bolt 150 are insertion-coupled. A screw structure having teeth and spaces may be formed between an outer circumferential surface of the shaft part 152 of the weld bolt 150 and an inner circumferential surface of the assembly nut 160.

For example, when the assembly nut 160 is rotated in one direction in a longitudinal direction of the shaft part 152, a distance between the head part 151 and the assembly nut 160 decreases so that the gasket 130 is compressed between the upper case 110 and the lower case 120. Accordingly, the gasket 130 seals a space between the upper case 110 and the lower case 120.

In other words, when a distance between the assembly nut 160 and the shaft part 152 of the weld bolt 150 decreases, a thickness of the gasket 130 decreases due to the compression force, but a contact force increases to airtightly protect the space between the upper case 110 and the lower case 120.

The protection hole 131 (see FIG. 3) of the gasket 130 has a structure surrounding both ends of the head part 151 of the weld bolt 150 in order to prevent moisture from penetrating between the upper case 110 and the lower case 120.

Second Embodiment

Figure 8:
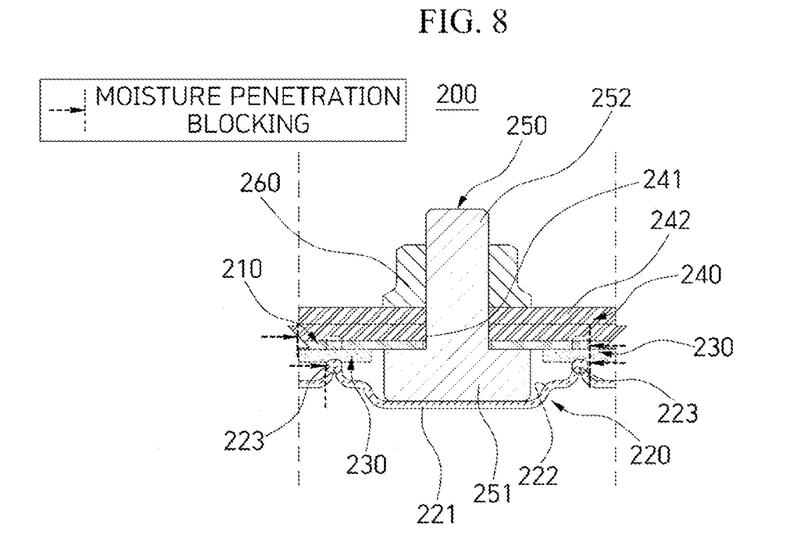
FIG. 8 is a partial cross-sectional view illustrating a high voltage battery protection pack according to a second embodiment of the present invention.

FIG. 8 is a partial cross-sectional view illustrating a high voltage battery protection pack according to a second embodiment of the present invention.

According to FIG. 8, in a high voltage battery protection pack 200, by forming a region in which an upper case 210 and a lower case 220 are assembled in an airtight structure, moisture penetration may be suppressed. In addition, the high voltage battery protection pack 200 is meaningful in that a connecting plate 221 of the lower case 220 is formed by embossing and engraving to reduce a size of a gasket 230, and a position of a weld bolt 250 may be restricted.

That is, a weld groove 222 formed by engraving and a ridge part 223 formed by embossing and airtightly engaged with the gasket 230 are formed at an upper end of the connecting plate 221 of the lower case 220.

In this case, the weld groove 222 has a structure in which an upper surface, which is welded to a head part 251 of the weld bolt 250, of the weld groove 222 is recessed in a shape corresponding to the head part 251. The structure of the weld groove 222 may be applied as one modified example which allows the weld bolt 250 to be more firmly fixed to the connecting plate 221.

In another modified example, a weld groove (not shown) recessed in a shape which is wider than the head part 251 may also be formed in an upper surface, to which the weld bolt 250 of the head part 251 is welded, of the connecting plate 221. In this case, a weld bead may be formed between the weld groove and the head part 251.

Meanwhile, a region of an upper end of the gasket 230 and a region of a lower end of the upper case 210 which are engaged with each other may be coupled in a snap-fit manner. In other words, a pin protruding upward may be formed on the upper end of the gasket 230, and a pin groove corresponding to the pin of the gasket 230 may be formed on the lower end of the upper case 210. Alternatively, as illustrated in FIG. 8, a pin hole through which the pin of the gasket 230 passes may also be formed in the lower end of the upper case 210.

Modified Example of Second Embodiment

Figure 9:
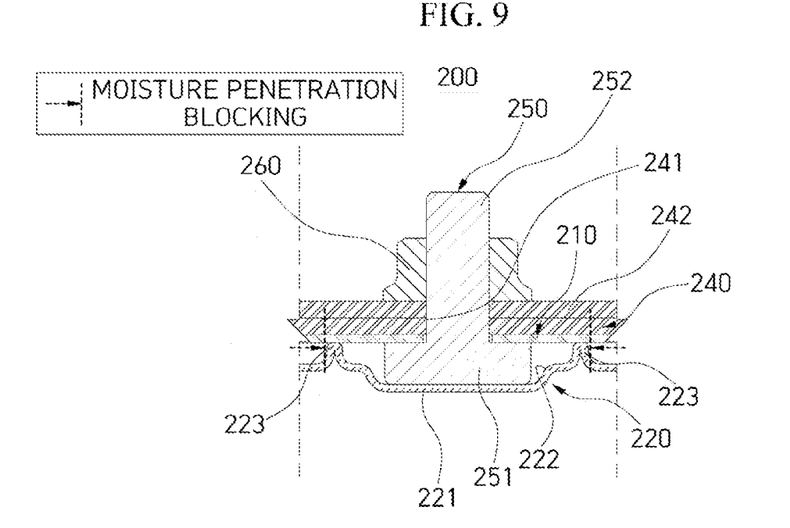
FIG. 9 is a partial cross-sectional view illustrating a modified example of a high voltage battery protection pack according to the second embodiment of the present invention.

FIG. 9 is a partial cross-sectional view illustrating a modified example of a high voltage battery protection pack according to the second embodiment of the present invention.

FIG. 9 is a view illustrating a modified example of FIG. 8, and a high voltage battery protection pack 200 in FIG. 9 has a structure in which, even in a state in which there is no gasket, a ridge part 223 of an upper end of a connecting plate 221 surrounding a head part 251 of a weld bolt 250 is formed by embossing between an upper case 210 and a lower case 220 to airtightly connect the upper case 210 and the lower case 220.

In this case, the ridge part 223 is formed to be bent upward to be in contact with the upper case 210. A region of the ridge part 223 and a region of the upper case 210 which are in contact with each other are in surface contact with each other. In this case, an upper end of the ridge part 223, which is in contact with the upper case 210, may include a separate adsorption sheet (not shown) in order to increase a contact force with the upper case 210.

Meanwhile, since the upper case 210 and the lower case 220 may be airtightly coupled to each other and spaced apart from each other to correspond to the head part 251 of the weld bolt 250, a lower end of the upper case 210 in contact with the upper end of the ridge part 223 may be coupled in a snap-fit manner.

Third Embodiment

Figure 10:
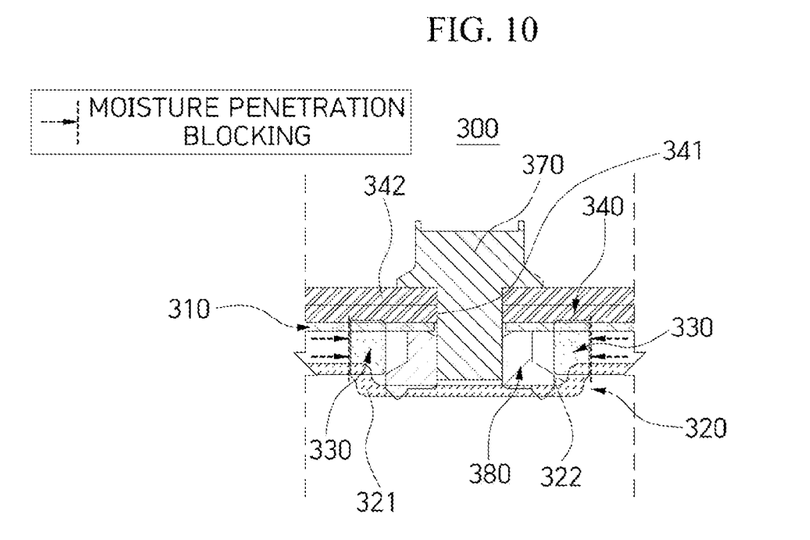
FIG. 10 is a partial cross-sectional view illustrating a high voltage battery protection pack according to a third embodiment of the present invention.

FIG. 10 is a partial cross-sectional view illustrating a high voltage battery protection pack according to a third embodiment of the present invention.

A high voltage battery protection pack 300 in FIG. 10 has a structure in which, instead of a weld bolt, a weld nut 380 is positioned between upper and lower cases 310 and 320 and welded thereto.

In the lower case 320, a connecting plate 321 having a shape corresponding to a coupling plate 111 (see FIG. 3) is formed to protrude from an outer circumferential surface of the lower case 320, and the weld nut 380 communicating with a coupling hole 112 (see FIG. 3) of the upper case 310 is welded to an upper portion of the connecting plate 321.

A gasket 330 seals a space between the upper case 310 and the lower case 320 and includes a protection hole surrounding the weld nut 380. In this case, a lower end of the upper case 310 and an upper end of the lower case 320 are formed so that some sections in which the lower end of the upper case 310 and the upper end of the lower case 320 are in contact with upper and lower end portions of the gasket 330 are recessed.

An assembly bolt 370 passes through a coupling hole of the upper case 310 and is insertion-coupled to the weld nut 380.

The assembly bolt 370 includes a head part in contact with a coupling plate of the upper case 310 and a shaft part which is formed to extend from the head part and includes a screw thread on an outer circumferential surface of the shaft part.

A length of the shaft part may be formed to be relatively smaller than a stack thickness of the coupling plate, the connecting plate 321, and the gasket 330.

The high voltage battery protection pack 300 is meaningful in that the connecting plate 321 of the lower case 320 is formed by engraving to reduce a size of the gasket 330, and a position of the weld nut 380 may be restricted.

That is, a weld groove 322 formed by engraving is formed in an upper end of the connecting plate 321 of the lower case 320. In this case, in the connecting plate 321, a perimeter of the weld groove 322 is airtightly engaged with the gasket 330.

The weld groove 322 has a structure in which an upper surface, to which the weld nut 380 is welded, of the weld groove 322 is recessed in a shape corresponding to the weld nut 380. This structure of the weld groove 322 may be applied as one modified example in which a weld nut 380 is more firmly fixed to a connecting plate 321.

The weld groove 322 of the connecting plate 321 may include a weld groove (not shown) in a surface of the weld groove 322 in contact with the weld nut 380.

Fourth Embodiment

Figure 11:
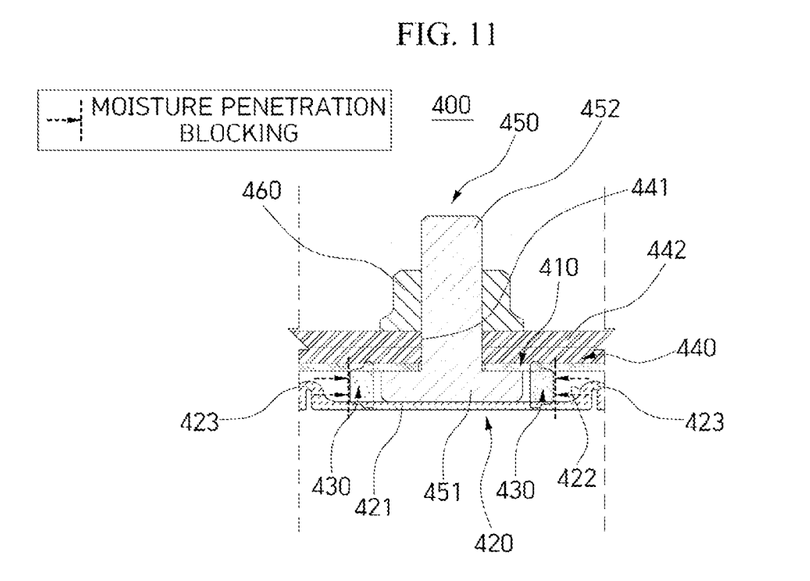
FIG. 11 is a partial cross-sectional view illustrating a high voltage battery protection pack according to a fourth embodiment of the present invention.

FIG. 11 is a partial cross-sectional view illustrating a high voltage battery protection pack according to a fourth embodiment of the present invention.

A high voltage battery protection pack 400 in FIG. 11 has a structure in which a gasket groove 422 is formed in a connecting plate 421 to fix a gasket 430.

In this case, the gasket groove 422 is a groove formed by embossing on the connecting plate 421, restricts a position of the gasket 430, and prevents moisture from penetrating a lower gap of the gasket 430.

In this case, the gasket 430 may be coupled to a lower end of an upper case 410 in a snap-fit manner to be fixed without shaking between the lower end of the upper case 410 and an upper end of a lower case 420.

Modified Example of Fourth Embodiment

Figure 12:
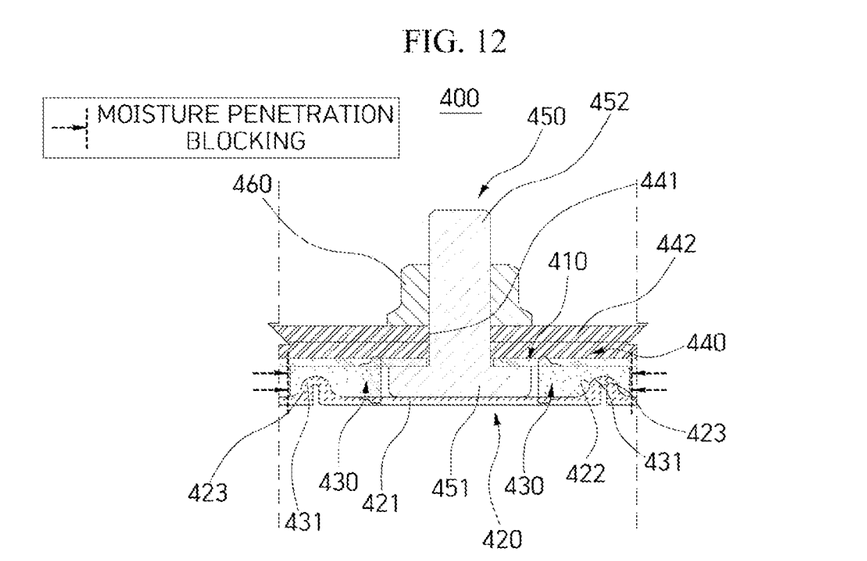
FIG. 12 is a partial cross-sectional view illustrating a modified example of a high voltage battery protection pack according to the fourth embodiment of the present invention.

FIG. 12 is a partial cross-sectional view illustrating a modified example of a high voltage battery protection pack according to the fourth embodiment of the present invention.

According to FIG. 12, since a basic objective of a gasket 430 is to prevent moisture from penetrating between an upper case 410 and a lower case 420, the gasket 430 includes an airtight groove 431 corresponding to a ridge part 423 formed on an upper end of a connecting plate 421 to be embossed.

The airtight groove 431 may be in contact with the ridge part 423, and thus the gasket 430 may be compressed to be fixed without shaking between the upper case 410 and the lower case 420.

Meanwhile, a gasket groove 422 positioned on the connecting plate 421 fixes the gasket 430 first, and secondarily, provides a space that may be filled with a weld bead to completely weld a head part 451 and the upper end of the connecting plate 421 in a state in which the gasket groove 422 is spaced apart from the head part 451 of the weld bolt 450.

According to the present invention, a weld hole of a lower case and a bush, which are moisture penetration paths, are removed so that moisture penetration can be prevented. Accordingly, the present invention can improve the airtightness performance and can reduce a cost.

In addition, according to the present invention, by improving a conventional method of forcibly inserting the bush into a gasket, effects of reducing a working time and significantly lowering a defective product generation rate are provided.

The present invention is not limited to the embodiments described above, and can be variously modified within a range allowed by the technical sprit of the present invention.

What is claimed is:

1. A high voltage battery protection pack comprising:
   an upper case including a coupling plate protruding along an outer circumferential surface of the upper case and a plurality of coupling holes formed in the coupling plate to be spaced apart from each other;
   a lower case in which a connecting plate having a shape corresponding to the coupling plate and including a weld groove formed by partial engraving is formed to protrude from an outer circumferential surface of the lower case;
   a weld nut which is disposed between and contacting the upper case and the lower case to maintain an axial force and is welded to the weld groove of the connecting plate;
   an assembly bolt which passes through the coupling hole of the upper case and is insertion-coupled to the weld nut; and
   a gasket which seals a space between the upper case and the lower case, wherein the gasket is disposed between and coupled to the upper case and the lower case in a snap-fit manner.

2. The high voltage battery protection pack of claim 1, wherein the gasket includes a protection hole which is disposed to be spaced apart from the weld nut and surrounds a perimeter of the weld nut.

3. The high voltage battery protection pack of claim 2, wherein the protection hole of the gasket has a diameter which is greater than a diameter of the weld nut.

4. The high voltage battery protection pack of claim 1, wherein a lower end of the upper case and an upper end of the lower case are formed so that some sections in which the lower end of the upper case and the upper end of the lower case are in contact with upper and lower end portions of the gasket are recessed.

5. The high voltage battery protection pack of claim 1, wherein the weld groove of the connecting plate includes the weld groove in a surface of the connecting plate in contact with the weld nut.

6. The high voltage battery protection pack of claim 1, wherein a bracket in which a connecting hole corresponding to the coupling hole of the upper case is formed is coupled to an upper portion of the coupling plate.

7. The high voltage battery protection pack of claim 6, wherein the bracket is formed in a shape corresponding to the coupling plate and includes reinforcing plates in some sections.

8. A high voltage battery protection pack comprising:
   an upper case including a coupling plate protruding along an outer circumferential surface of the upper case and a plurality of coupling holes formed in the coupling plate to be spaced apart from each other;
   a lower case in which a connecting plate formed in a shape corresponding to the coupling plate is formed to protrude from an outer circumferential surface of the lower case, and a weld nut communicating with and adjacent to the coupling hole of the upper case and welded to an upper portion of the connecting plate;
   a gasket which seals a space between the upper case and the lower case and includes a protection hole surrounding the weld nut; and
   an assembly bolt which passes through the coupling hole of the upper case and is insertion-coupled to the weld nut.

9. The high voltage battery protection pack of claim 8, wherein the assembly bolt includes:
   a head part in contact with the coupling plate of the upper case; and
   a shaft part which is formed to extend from the head part and includes a screw thread on an outer circumferential surface of the shaft part.

10. The high voltage battery protection pack of claim 9, wherein a length of the shaft part is formed to be smaller than a stack thickness of the coupling plate, the connecting plate, and the gasket.

11. The high voltage battery protection pack of claim 8, further comprising a bracket including a connecting hole communicating with the coupling hole and disposed on the coupling plate,
   wherein the assembly bolt passes through the coupling hole and is insertion-coupled to the weld nut in a state in which the assembly bolt passes through the connecting hole.

12. The high voltage battery protection pack of claim 11, wherein the assembly bolt includes:
   a head part in contact with the bracket of the upper case; and
   a shaft part which is formed to extend from the head part and includes a screw thread on an outer circumferential surface of the shaft part.

13. The high voltage battery protection pack of claim 12, wherein a length of the shaft part is smaller than or equal to a stack thickness of the bracket, the coupling plate, the connecting plate, and the gasket.

14. A high voltage battery protection pack comprising:
   an upper case including a coupling plate protruding along an outer circumferential surface of the upper case and a plurality of coupling holes formed in the coupling plate to be spaced apart from each other;
   a lower case in which a connecting plate having a shape corresponding to the coupling plate and including a ridge part having an embossed portion and protruding in a direction towards the upper case from an outer circumferential surface of the lower case;
   a weld bolt disposed between the upper case and the lower case to maintain an axial force and welded between the ridge part of the connecting plate; and
   a gasket which seals a space between the upper case and the lower case in a state in which the gasket surrounds a head part of the weld bolt on an upper end of the connecting plate.

15. The high voltage battery protection pack of claim 14, wherein the gasket includes a protection hole which is disposed to be spaced apart from the weld bolt and surrounds a perimeter of the weld bolt.

16. The high voltage battery protection pack of claim 15, wherein the protection hole of the gasket has a diameter which is relatively greater than a diameter of the head part of the weld bolt.

17. The high voltage battery protection pack of claim 14, wherein a lower end of the upper case is formed so that some sections in which the lower end of the upper case is in contact with an upper end portion of the gasket are recessed.

18. The high voltage battery protection pack of claim 14, wherein the connecting plate includes a gasket groove in a surface of the connecting plate in contact with the weld bolt.

\* \* \* \* \*